United States Patent [19]
Soeda

[11] Patent Number: 5,887,383
[45] Date of Patent: Mar. 30, 1999

[54] HYDROPONIC CULTURE APPARATUS

[75] Inventor: Masanao Soeda, Kanagawa, Japan

[73] Assignee: Farmer's Design Inc., Kanagawa, Japan

[21] Appl. No.: 847,445

[22] Filed: Apr. 24, 1997

[30] Foreign Application Priority Data

Apr. 24, 1996 [JP] Japan .................................. 8-102711

[51] Int. Cl.⁶ .................................................. A01G 31/00
[52] U.S. Cl. ............................................. 47/59; 47/62 R
[58] Field of Search .............................. 47/59, 60, 62 R, 47/62 A, 62 N

[56] References Cited

U.S. PATENT DOCUMENTS

| | | | |
|---|---|---|---|
| 4,016,677 | 4/1977 | Julinot | 47/64 |
| 4,419,842 | 12/1983 | Paloian | 47/62 |
| 4,447,983 | 5/1984 | Shinada | 47/48.5 |
| 4,754,571 | 7/1988 | Riechmann | 47/59 |
| 5,056,260 | 10/1991 | Sutton | 47/59 |
| 5,136,804 | 8/1992 | Rothem et al. | 47/60 |
| 5,394,647 | 3/1995 | Blackford, Jr. | 47/62 |

FOREIGN PATENT DOCUMENTS

SHO63-85019  4/1988  Japan ............................ A01G 31/00

Primary Examiner—Michael J. Carone
Assistant Examiner—Yvonne R. Abbott
Attorney, Agent, or Firm—Howell & Haferkamp, L.C.

[57] ABSTRACT

A liquid supply pump unit for hydroponic culture, which can perform oxygen enrichment and has a small power consumption, and a hydroponic culture apparatus, which utilizes this liquid supply pump unit and automatically supplies a larger amount of oxygen in the daytime when the plant growth is active, are disclosed. The liquid supply pump unit includes a container for containing a culture liquid for hydroponic plant culture, a partition member for partitioning an interior of the container to charge the partitioned interior with air, an air blow portion formed below the partition member to supply air inside the partition member, an air supply pump for supplying air to the air blow portion, an air discharge portion for intermittently discharging air from the partition member to a portion above the partition member, and an inflow/outflow pipe connected to a side surface of the container to allow the culture liquid to flow into/from the container upon a change in liquid level of the culture liquid caused by air discharge from the air discharge portion. The hydroponic culture apparatus described above is constituted by connecting a culture tank to the liquid supply pump unit described above, and uses a solar battery as the drive power supply of the air supply pump.

17 Claims, 5 Drawing Sheets

HYDROPONIC CULTURE APPARATUS

BACKGROUND OF THE INVENTION

1. Field of the Invention

The present invention relates to a liquid supply pump unit for flowing a culture liquid used for plant culture and a hydroponic culture apparatus using this liquid supply pump unit and, more particularly, to a liquid supply pump unit switch generates a water flow in a culture liquid by utilizing the air supply operation of an air supply pump used for replenishing oxygen dissolved in the culture liquid and which utilizes a solar battery as a drive power supply for this air supply pump, and a hydroponic culture apparatus using this air supply pump unit.

2. Description of the Prior Art

Hydroponic culture is a method of culturing plants not by using soil but by supplying components necessary for plant growth with an artificially adjusted culture liquid. In hydroponic culture, to supply the culture liquid to the plant, various types of methods are employed, e.g., a liquid level change method of changing the liquid level of the culture liquid, a flow method of circulating a culture liquid, a spray method of spraying a culture liquid to the plant root, and the like.

In hydroponic culture, nutrient components necessary for plant growth must be sufficiently supplied to the culture liquid. In addition, it is very important to supply a sufficient amount of oxygen to the plant root in order to promote the normal growth of the plant without rotting the root. To supply a sufficient amount of oxygen to the root, a sufficient amount of oxygen may be dissolved in the culture liquid to increase the dissolved oxygen concentration. Also, it is effective to flow the culture liquid.

In Japanese Examined Patent Publication No. 5-25448, the present inventors disclose a hydroponic culture apparatus using the liquid level change method. In this hydroponic culture apparatus, air is supplied from an air supply pump into a culture liquid to dissolve oxygen in the culture liquid, thereby increasing the amount of oxygen dissolved in the culture liquid. Also, a partition member formed in a culture liquid tank is temporarily charged with the supplied air. The reserved air in the partition member is intermittently discharged into the culture liquid to change the liquid level of the culture liquid, thereby flowing the culture liquid. When the liquid level is lowered, the plant root is brought into direct contact with air, thereby supplying oxygen to the root. However, according to this apparatus, depth of the culture liquid tank may be 25 cm to 30 cm and relatively much quantity of the culture liquid is necessary.

According to a conventional method of increasing the amount of dissolved oxygen by dissolving oxygen in the culture liquid (this will be called "oxygen enrichment" hereinafter), air is supplied into the culture liquid by using an air supply pump and is discharged into the culture liquid in the form of small bubbles, thereby performing oxygen enrichment. According to a conventional method of supplying the culture liquid to the plant, the culture liquid is supplied into a culture tank by using a liquid supply pump, and a culture liquid flow is generated and flowed in the culture tank. According to these methods, the air supply pump and the liquid supply pump must always be operated, increasing the cost.

In particular, since the liquid supply pump for generating a water flow requires a large power consumption, a plurality of culture tanks are connected to one liquid supply pump, and the water flow directions are switched to generate a water flow in each culture tank. Also, the operation of the liquid supply pump during the nighttime is cut off. However, a selector for switching the water flow, a controller for changing the operation contents between the daytime and the nighttime, and the like become additionally necessary, leading to an increase in equipment cost.

The plant activity and a change in quantity of light substantially correspond to each other. When the quantity of light increases, the necessary oxygen amount also increases accordingly. The operation amount of the air supply pump preferably increases accordingly. In order to perform a control operation in accordance with the quantity of light in this manner, a sensor for detecting the quantity of light irradiated on the plant and other controllers become necessary, leading to an increase in equipment cost.

SUMMARY OF THE INVENTION

It is the first object of the present invention to provide a liquid supply pump unit for hydroponic culture which can perform oxygen enrichment and requires a small power consumption.

It is the second object of the present invention to provide a hydroponic culture apparatus which automatically supplies a larger amount of oxygen in the daytime when the plant growth is active.

In order to achieve the above objects, according to the present invention, there is provided a liquid supply pump unit comprising a container for containing a culture liquid for hydroponic plant culture, a partition member for partitioning an interior of the container to charge the partitioned interior with air, an air blow portion formed below the partition member to supply air inside the partition member, an air supply pump for supplying air to the air blow portion, an air discharge portion for intermittently discharging air from the partition member to a portion above the partition member, and an inflow/outflow pipe connected to a side surface of the container to allow the culture liquid to flow into/from the container upon a change in liquid level of the culture liquid caused by air discharge from the air discharge portion. This liquid supply pump unit is preferably connected to a plant culture tank through the inflow/outflow pipe.

According to the liquid supply pump unit having the above arrangement, a change in water level of the culture liquid can occur by only operating the air supply pump that supplies a gas into the culture liquid in order to perform an oxygen enrichment operation. The culture liquid can be supplied to the culture tank by utilizing a rise in the water level and can be returned from the culture tank by utilizing a fall of the water level. Therefore, the culture liquid can be flowed without using a liquid supply pump having a large power consumption while performing the oxygen enrichment operation with a small power consumption.

According to the present invention, there is also provided a hydroponic culture apparatus constituted by connecting a culture tank to the inflow/outflow pipe of the liquid supply pump unit described above. More preferably, the liquid supply pump unit and the culture tank are connected to each other with an outflow pipe and an inflow pipe in place of the inflow/outflow pipe, the outflow pipe has a one-way valve for allowing only a flow of the culture liquid from the liquid supply pump unit to the culture tank, and an outflow port directed to the culture tank to open at a position in the culture tank far from a liquid supply pump unit side, and the inflow pipe has a one-way valve for allowing only a flow of the culture liquid from the culture tank to the liquid supply pump unit, and an inflow port on a culture tank side which is mounted on a side surface of the culture tank on the liquid supply pump unit side.

According to the hydroponic culture apparatus having the above arrangement, when the water level of the liquid supply pump unit rises, the culture liquid is supplied to the culture tank through the outflow pipe. When the water level is lowered, the culture liquid is returned from the culture tank to the liquid supply pump unit through the inflow pipe. The culture liquid in the culture tank is thus circulated. Furthermore, if the outflow end of the outflow pipe is open at a position in the culture tank far from the liquid supply pump unit and the inflow pipe is connected to a side close to the liquid supply pump unit, the culture liquid is supplied deep into the culture tank and is returned to the liquid supply pump unit from a portion before the culture tank. Therefore, the culture liquid is circulated efficiently in the entire culture tank.

In the liquid supply pump unit or the hydroponic culture apparatus described above, since the air supply pump has a small power consumption, it can be sufficiently driven with a solar battery. In the liquid supply pump unit or the hydroponic culture apparatus according to the present invention, if a solar battery is used as the drive power supply of the air supply pump, the electromotive force of the solar battery increases during the daytime when the plant growth is active and the air supply amount of the air supply pump increases accordingly. Therefore, the oxygen enrichment operation is performed actively, and the change in the water level of the culture liquid becomes fast, so that circulation of the culture liquid becomes active. As a result, the air supply operation of the air supply pump can be performed to match the growth of the plant.

When the solar battery is used as the drive power supply of the air supply pump, a commercial power need not be consumed. Then, wirings for connecting a commercial power supply become unnecessary, and a switching operation becomes unnecessary during the nighttime when the air supply pump need not be driven, leading to a decrease in cumbersome operation, a decrease in running cost, and a simplification in equipment.

In order to ensure the minimum oxygen replenishment during the nighttime or on a cloudy day, a commercial power supply is preferably used as an auxiliary power supply to drive the air supply pump. A secondary battery stored by solarization during the daytime may also be used as the auxiliary power supply.

In the liquid supply pump unit or the hydroponic culture apparatus described above, as the air discharge portion for intermittently discharging air from the partition member to a portion above the partition member, for example, a U-shaped pipe having one end opening in an upper portion of an air reservoir partitioned by the partition member and the other end extending through the partition member to open above the partition member; a double pipe having an outer pipe opening in an upper portion of an air reservoir partitioned by the partition member and an inner pipe extending through the partition member to open above the partition member; a valve which is opened when a pressure reaches a predetermined value and continuously open until a pressure difference substantially disappears; or a valve which is opened/closed appropriately in accordance with a lapse of time may be employed.

According to still another embodiment, a hydroponic culture apparatus may be constituted by connecting a solar battery to an air supply pump and planting plants directly in a container, a water level of which is changed by the air supply pump. According to this embodiment, the air supply pump is operated by the sunlight to change the water level of the culture liquid in the container. Therefore, oxygen can be dissolved in the culture liquid and the culture liquid can be flowed to come in contact with the roots of the plants, automatically to match the growth of the plants without using an external commercial power supply.

DETAILED DESCRIPTION OF PREFERRED EMBODIMENTS

The present invention will be described with reference to the accompanying drawings.

Figure 1:
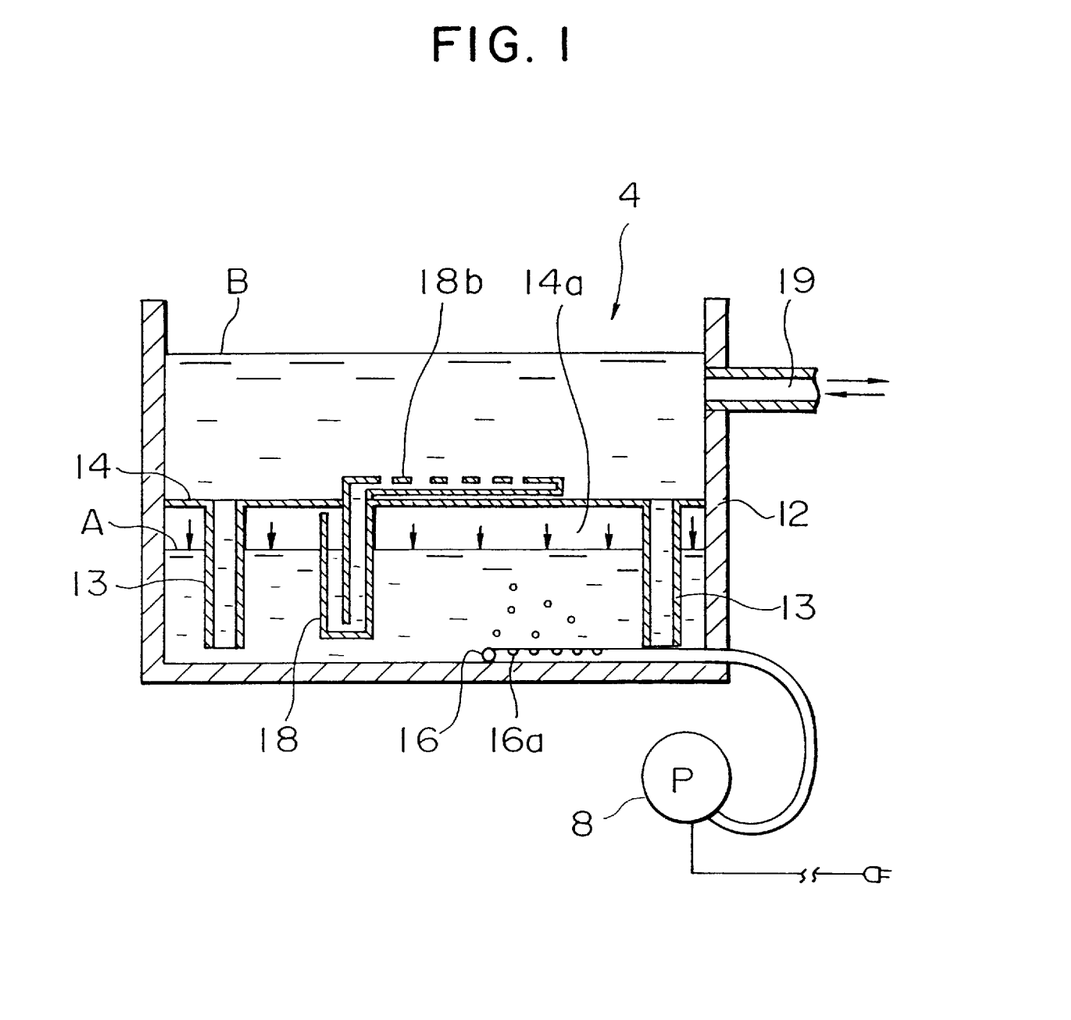
FIG. 1 is a sectional view showing a liquid supply pump unit according to an embodiment of the present invention.

FIG. 1 is a sectional view showing a liquid supply pump unit according to an embodiment of the present invention.

As shown in FIG. 1, a liquid supply pump unit 4 has a container 12, a partition member 14, an air supply pump 8, a pipe 16, a discharge pipe 18, and an inflow/outflow pipe 19. The container 12 contains a culture liquid. The partition member 14 is formed in the container 12. The air supply pump 8 supplies air into the container 12. The pipe 16 is arranged below the partition member 14 to discharge air supplied from the air supply pump 8 through its pores 16a. The discharge pipe 18 discharges air from the partition member 14. The inflow/outflow pipe 19 allows the culture liquid to flow in/out.

The container 12 is filled with a predetermined culture liquid containing an appropriate amount of hydroponic culture fertilizer. The partition member 14 is integrally fixed to the container 12 to horizontally divide the interior of the container 12. A communication pipe 13 is formed with the partition member 14 to be directed to the bottom surface of the container 12. Since a space is formed between the distal end of the communication pipe 13 directed to the bottom surface of the container 12 and the bottom surface of the container 12, the culture liquid communicates between portions above and below the partition member 14 through the communication pipe 13. An interior partitioned with the partition member 14, i.e., a space 14a inside the partition member 14 can be charged with air supplied from the air supply pump 8 into the culture liquid through the pipe 16.

When the air supply pump 8 operates, the pipe 16 connected to the air supply pump 8 supplies air into the culture liquid in the form of small bubbles through the pores 16a having comparatively small diameters. When air is supplied into the culture liquid in the form of small bubbles in this manner, mixture and dissolution of oxygen into the culture liquid can be promoted. The gas supplied by the air supply pump 8 is not limited to air but can be any other gas.

The discharge pipe 18 is U-shaped, and has one opening end open in an upper portion inside the partition member 14 and the other end extending through the partition member 14 to open in the culture liquid in the container 12. The inflow/outflow pipe 19 is mounted on a portion of the side surface of the container 12.

The operation of the liquid supply pump unit 4 will be described with reference to FIG. 1.

The other end (not shown) of the inflow/outflow pipe 19 is connected in advance to a culture tank (not shown) to which the culture liquid is to be supplied with the liquid supply pump unit 4. The inflow/outflow pipe 19 may be connected not only to the culture tank but also to other containers, e.g., a chemical process tank. The culture liquid is supplied into the container 12 such that it has the same water level in both the container 12 and the culture tank. The air supply pump 8 is operated to inject air into the culture liquid through the pores 16a of the pipe 16. Thus, air becomes partly dissolved in the culture liquid, and the interior 14a of the partition member 14 is charged with non-dissolved air.

As the interior 14a of the partition member 14 is charged with air, a liquid level A in the partition member 14 is pushed downward, and the culture liquid flows out to a portion above the partition member 14 through the communication pipe 13, so that a liquid level B in the container 12 rises gradually. Upon the rise of the liquid level B, the culture liquid dissolved with air flows into the culture tank, the water level of which is lowered, through the inflow/outflow pipe 19.

As time passes, the partition member 14 is charged with air. When the liquid level A inside the partition member 14 reaches the lower portion of the discharge pipe 18, air temporarily flows through the discharge pipe 18 to be discharged to the portion above the partition member 14. As a result, the culture liquid above the partition member 14 flows into the interior 14a of the partition member 14 through the communication pipe 13, and the liquid level A rises. Air is continuously discharged from the discharge pipe 18 until the liquid level A inside the partition member 14 reaches the upper portion of the discharge pipe 18, and the liquid level A rises immediately close near the partition member 14.

As air is discharged from the discharge pipe 18, oxygen is further dissolved in the culture liquid. If pores 18b are formed in the opening portion of the discharge pipe 18 which is above the partition member 14 so that air is injected from the pores 18b, the oxygen enrichment operation can be performed more effectively.

When the liquid level B in the container 12 becomes lower than the liquid level in the culture tank due to air discharge from the discharge pipe 18, the culture liquid flows from the culture tank into the container 12 through the inflow/outflow pipe 19.

The above-described operation is repeated while the air supply pump 8 operates, and inflow/outflow of the culture liquid is repeated between the liquid supply pump unit 4 and the culture tank. Therefore, with this liquid supply pump unit 4, the culture liquid circulating pump operation of dissolving air (or other gases) in the culture liquid in the container 12, supplying this culture liquid from the container 12 into the culture tank, and returning the culture liquid from the culture tank to the container 12 after the lapse of a predetermined period of time can be performed by the air supply pump 8. In addition, the power consumption required for operating the air supply pump 8 is very small.

A hydroponic culture apparatus according to another embodiment of the present invention will be described with reference to FIG. 2A.

Figure 2A:
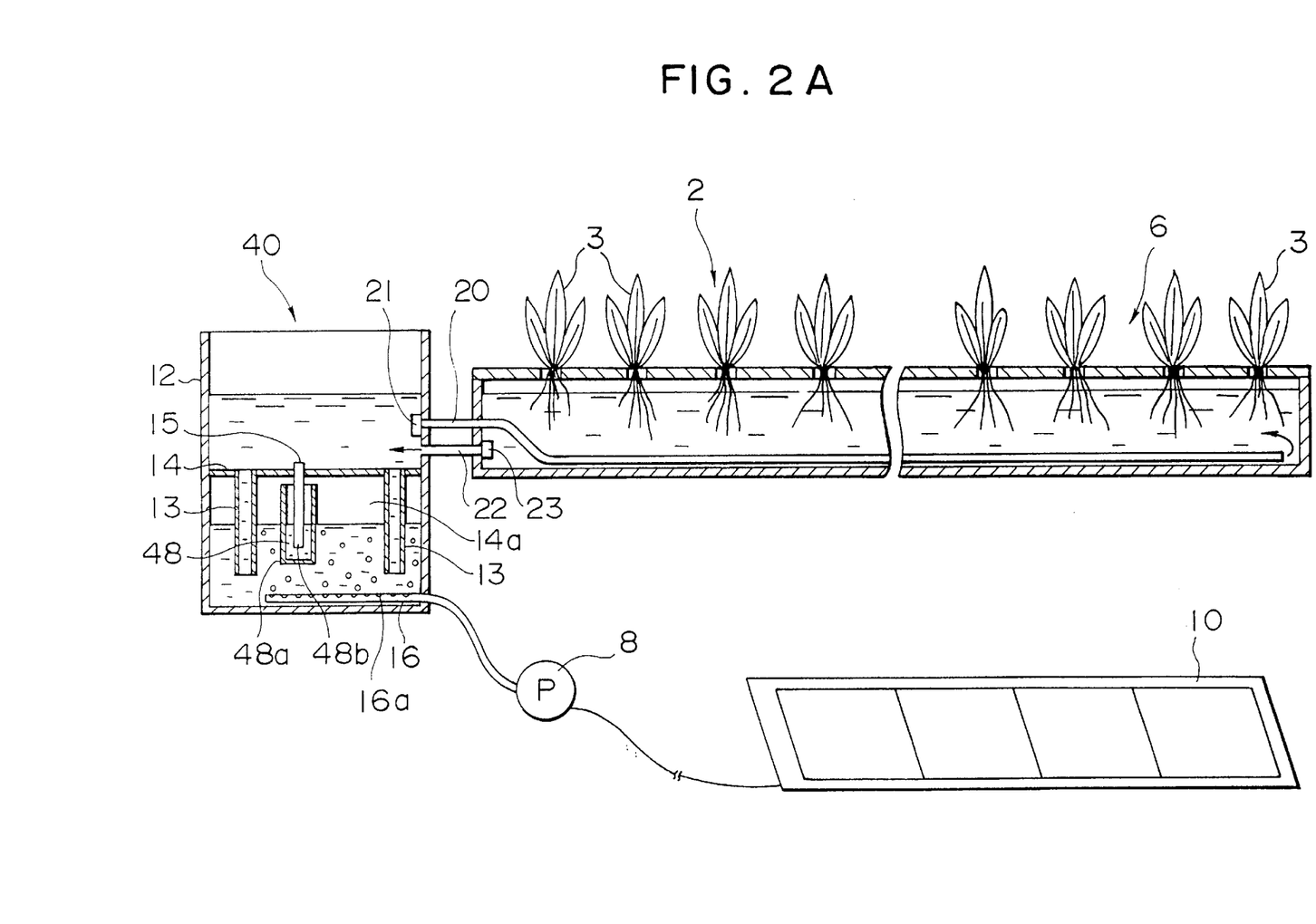
FIG. 2A is a sectional view showing a hydroponic culture apparatus according to an embodiment of the present invention.

As shown in FIG. 2A, a hydroponic culture apparatus 2 has a liquid supply pump unit 40, a culture tank 6, an air supply pump 8 for supplying air to the liquid supply pump unit 40, and a solar battery 10 for operating the air supply pump 8. The liquid supply pump unit 40 and the culture tank 6 are connected to each other with an outflow pipe 20 and an inflow pipe 22.

The liquid supply pump unit 40 has an arrangement almost identical to that of the liquid supply pump unit 4 shown in FIG. 1. A partition member 14 and a discharge pipe 48 are formed in a container 12. Air supplied from the air supply pump 8 is discharged through pores 16a formed in a pipe 16, and an interior 14a of the partition member 14 is charged with the air. Air is intermittently discharged from the interior 14a of the partition member 14 through the discharge pipe 48. As a result, the water level in the container 12 changes. The discharge pipe 48 is a double pipe constituted by an outer pipe 48a which opens in the upper portion of the interior 14a of the partition member 14, and an inner pipe 48b which extends through the partition member 14 to open in the culture liquid in the container 12. In the hydroponic culture apparatus 2 shown in FIG. 2A, in place of the inflow/outflow pipe 19 of the liquid supply pump unit 4 shown in FIG. 1, two pipes, i.e., the outflow pipe 20 and the inflow pipe 22, are connected to the side surface of the container 12.

The outflow pipe 20 extends deep into the culture tank 6 from its mounting portion where it is mounted on the container 12 of the liquid supply pump unit 40. On the mounting port where the outflow pipe 20 is mounted on the container 12, a one-way valve 21 is mounted which allows a flow from the liquid supply pump unit 40 to the culture tank 6 and prohibits an opposite-direction flow (i.e., a flow from the culture tank 6 to the liquid supply pump unit 40). The one-way valve 21 may also be mounted in the middle of the outflow pipe 20.

One end of the inflow pipe 22 is mounted on the side surface of the container 12 on the culture tank 6 side, and the other end thereof is mounted on the side surface of the culture tank 6 on the container 12 side. A one-way valve 23 is mounted on end portion of the inflow pipe 22 on the culture tank 6 side. The one-way valve 23 allows a flow from the culture tank 6 to the liquid supply pump unit 40 and prohibits the opposite-direction flow. The one-way valve 23 may also be mounted in the middle of the outflow pipe 22. These one-way valves 21 and 23 are preferably made of, e.g., rubber, so that they can operate even under a comparatively low water pressure.

The operation of the hydroponic culture apparatus 2 will be described.

Predetermined amounts of culture liquid fill the container 12 of the liquid supply pump unit 40 and the culture tank 6, respectively, to the same water level. In this state, when the air supply pump 8 is operated upon reception of a power from the solar battery 10 as the power supply, air is supplied into the container 12 through the pores 16a of the pipe 16. Part of the supplied air is dissolved in the culture liquid to perform oxygen enrichment. The partition member 14 is charged with the remaining supplied air to gradually lower the water level inside the partition member 14. Along with this, the water level in the container 12 rises in proportion of the air amount in the partition member 14.

When the water level in the container 12 becomes higher than the water level in the culture tank 6, the culture liquid in the container 12 flows into the culture tank 6 through the outflow pipe 20. Since the outflow pipe 20 opens deep in the culture tank 6, the culture liquid which is oxygen-enriched in the container 12 to have a high dissolved oxygen degree is discharged deep into the culture tank 6.

As the partition member 14 is further charged with air and the water level inside the partition member 14 reaches the lower end of the inner pipe 48b, air flows from the partition member 14 through the inner pipe 48b to be temporarily discharged from an open end 15 of the inner pipe 48b. Air discharge from the open end 15 continues until the water level inside the partition member 14 reaches the upper portion of the outer pipe 48a. A plurality of pores may be formed as the open end 15. If pores are formed as the open end 15, the oxygen enrichment operation of the culture liquid can be performed more efficiently.

When air inside the partition member 14 is mostly discharged to the portion above the partition member 14 in this manner, the water level in the container 12 is lowered abruptly, and the liquid level in the culture tank 6 becomes higher than that in the container 12. For this reason, the culture liquid in the culture tank 6 flows into the container 12 through the inflow pipe 22. Since the inflow pipe 22 is connected to the portion of the culture tank 6 on the container 12 side, the culture liquid flows into the container 12 from a side opposite to the opening portion of the outflow pipe 20, so that the culture liquid circulates in the entire portion of the culture tank 6. More specifically, the oxygen-enriched culture liquid which is discharged deep into the culture tank 6 and has a high dissolved oxygen degree flows to the liquid supply pump unit 40 side while oxygen in it is gradually consumed. This culture liquid finally flows into the container 12 to be oxygen-enriched again, and is supplied into the culture tank 6.

Figure 2B:
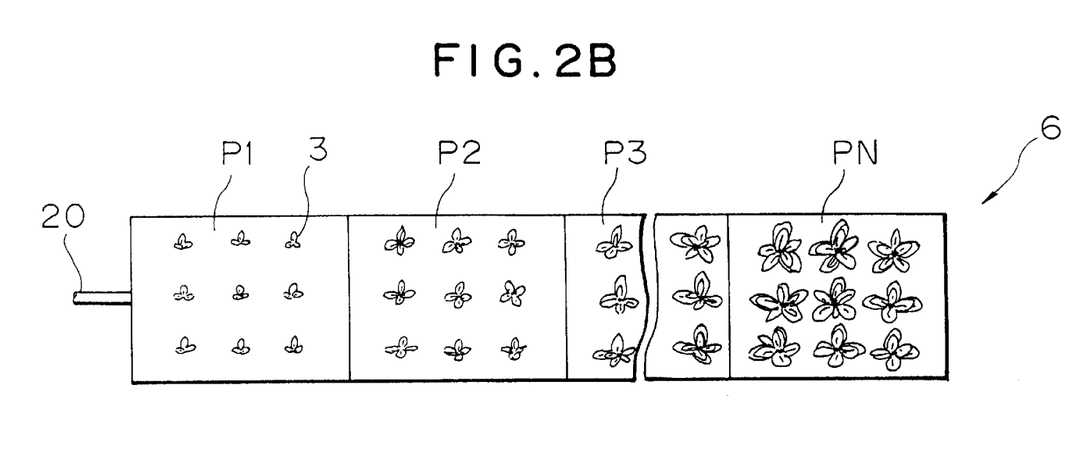
FIG. 2B is a top view of a culture tank of FIG. 2A showing a modification.
Figure 2C:
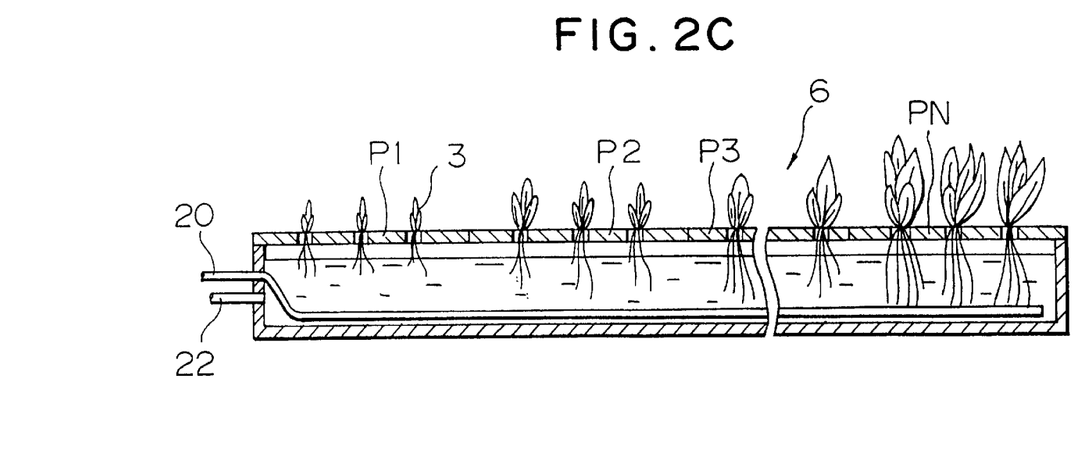
FIG. 2C is a sectional view of the culture tank of FIG. 2B.

As shown in FIG. 2B and FIG. 2C, assume that plants 3 are planted on culture panels P1 to PN in accordance with the growth steps. These panels are arranged toward the deep end of the culture tank 6 in accordance with the growth levels such that the plant roots are dipped in the culture liquid. The panel P1 of a plant which is at the lowest growth level is placed on the frontmost side of the container 12, and the panel PN of a plant which is at the highest growth level is placed farthest from the container 12. Then, since the outflow pipe 20 opens deep in the culture tank 6, the culture liquid having a high dissolved oxygen degree can be supplied to the plant which is at the highest growth level and thus requires oxygen replenishment the most. Panels from which the grown plants have been harvested may be removed from the culture tank 6 and the remaining panels may be sequentially shifted toward the deepest end of the culture tank 6, so that highly efficient plant culture can be performed.

The solar battery 10 serving as the power supply of the liquid supply pump unit 40 changes its electromotive force in accordance with the quantity of light. The electromotive force becomes the largest during the daytime when the plant growth is active and the sunlight radiation is large. If the electromotive force of the solar battery 10 is large, the rotation speed of the motor that drives the air supply pump 8 increases. Thus, the air supply amount of the pump per unit time increases, and the partition member 14 is charged with a larger amount of air per unit time. As a result, the oxygen enrichment operation is performed frequently, the time interval between air discharge operations becomes short, and circulation of the culture liquid between the container 12 and the culture tank 6 becomes frequent. In other words, the larger the sunlight radiation amount, the shorter the cycle with which the oxygen-enriched culture liquid is supplied to the culture tank 6. Thus, oxygen supply in accordance with the active growth of the plants 3 becomes possible.

When only the solar battery 10 is utilized, since the solar battery 10 does not generate power in the nighttime, the operation of the liquid supply pump unit 40 is stopped in the nighttime. A commercial power supply may be employed together with the solar battery 10, so that the air supply pump 8 is operated even in the nighttime to perform necessary minimum air supply. A secondary battery stored by solarization during the daytime may also be used in the nighttime.

A hydroponic culture apparatus according to another embodiment of the present invention will be described with reference to FIG. 3.

Figure 3:
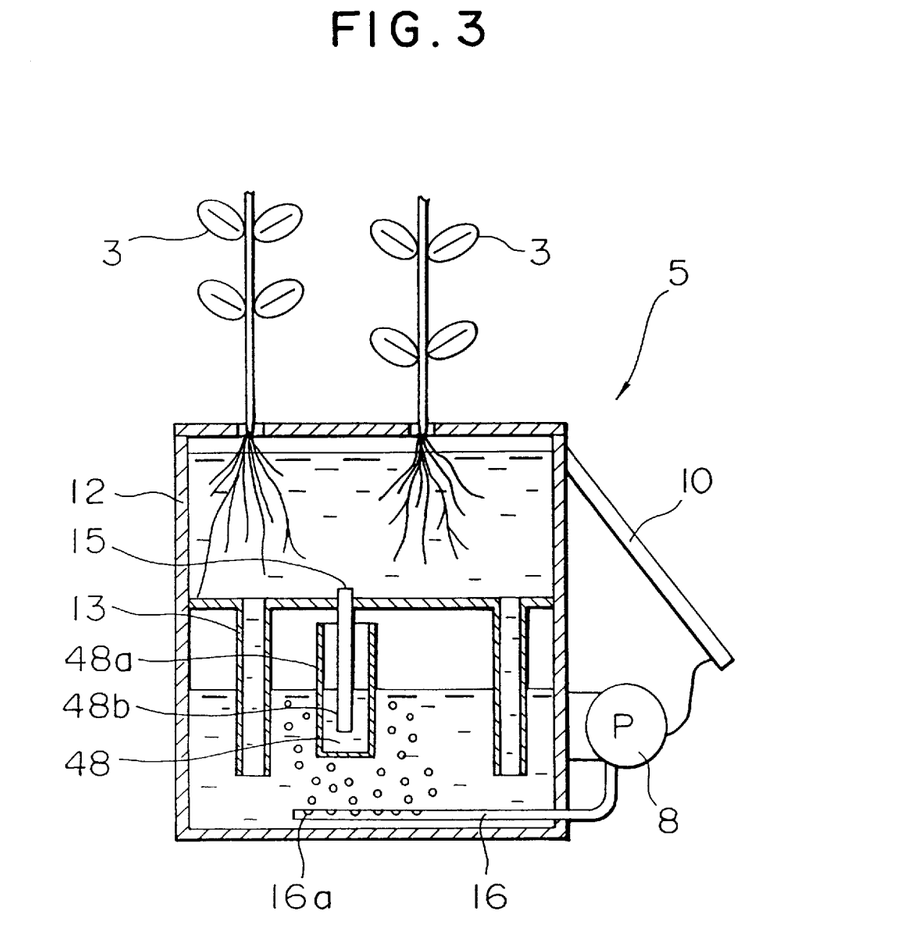
FIG. 3 is a sectional view showing a hydroponic culture apparatus according to another embodiment of the present invention.

As shown in FIG. 3, a hydroponic culture apparatus 5 does not has a culture tank 6 used in the hydroponic culture apparatus 2 shown in FIG. 2, and plants 3 are planted to a container 12 itself. A solar battery 10 is connected to an air supply pump 8, in the same manner as in FIG. 2. The solar battery 10 may be directly mounted on the container 12, as shown in FIG. 3, or may be set remote from the hydroponic culture apparatus 5 and mounted on a window, a veranda, or the like. The hydroponic culture apparatus 5 shown in FIG. 3 includes the same arrangement as that of the liquid supply pump unit 40 shown in FIG. 2, and the same constituent elements are denoted by the same reference numerals.

With this hydroponic culture apparatus 5, when the air supply pump 8 is operated upon reception of a power from the solar battery 10 as the power supply, oxygen is dissolved in the culture liquid in the container 12, and a partition member 14 is charged with air. As a result, the water level in the container 12 rises gradually. When the partition member 14 is charged with a predetermined amount of air, air is temporarily discharged from a discharge pipe 48 to lower the water level. This operation is repeatedly performed. Since the water level of the culture liquid in the container 12 changes, the culture liquid which is in contact with the roots of the plants 3 is flowed, and the oxygen-enriched fresh culture liquid is constantly supplied to the roots. When the water level of the culture liquid is lowered, the roots come in direct contact with air to directly absorb oxygen in the air.

In this embodiment, during hours when the sunlight radiation amount is large, the plant growth becomes active and the electromotive force of the solar battery 10 increases accordingly. Thus, the air supply amount with the air supply pump 8 increases to promote the oxygen enrichment operation. Also, the water level of the culture liquid in the container 12 changes frequently, thereby promoting the operation of replenishing oxygen to the roots of the plants 3. Therefore, with the hydroponic culture apparatus 5 according to this embodiment, a commercial power supply need not be connected. If the hydroponic culture apparatus 5 is placed in a hall or veranda where it gets a plenty of sunshine, the plants can be grown with a smooth progress even at homes or the like without requiring a cumbersome operation or a large space.

An embodiment in which a plurality of culture tanks 6 are connected to an air supply pump 8 will be described with reference to FIG. 4.

Figure 4:
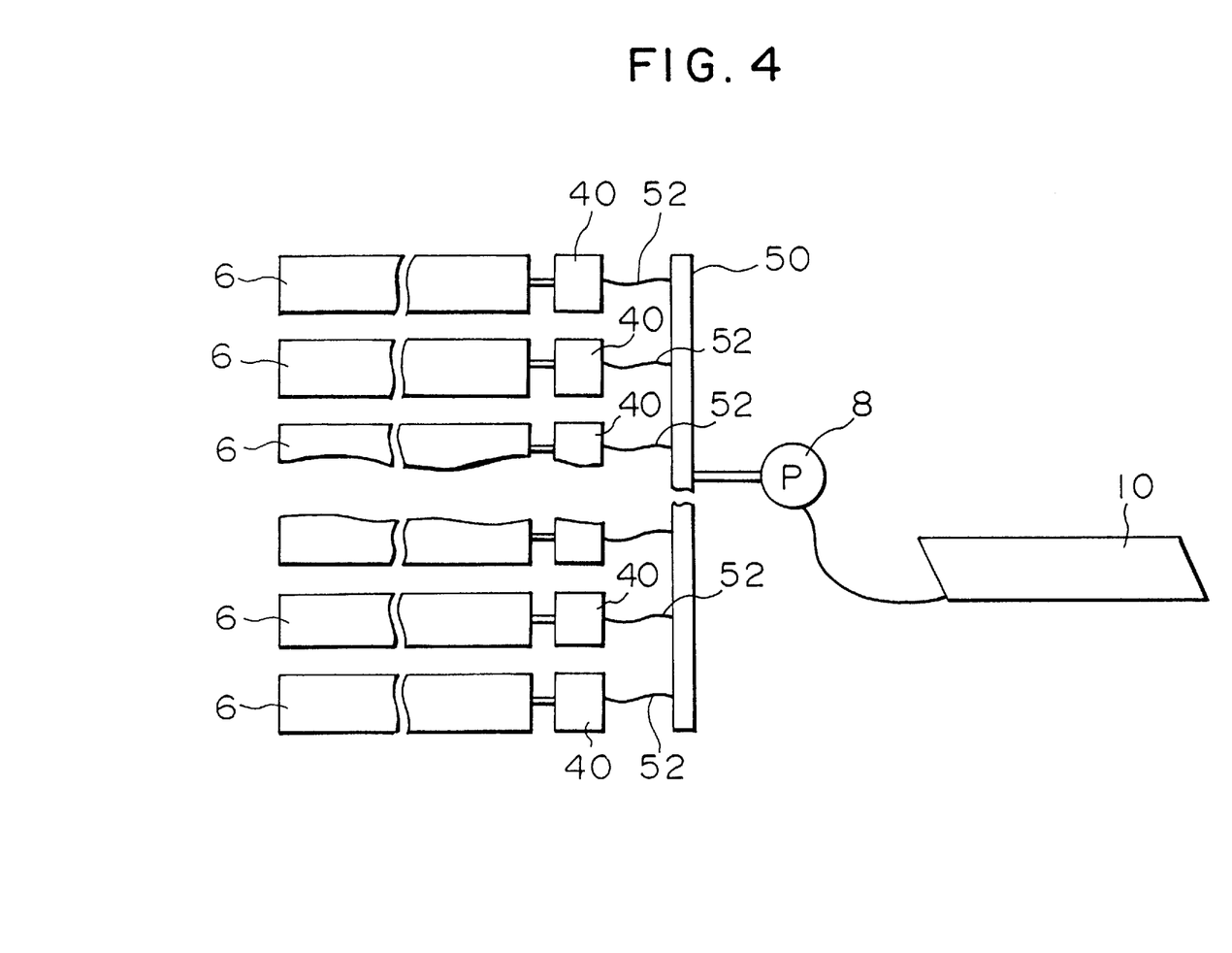
FIG. 4 is a schematic view showing the arrangement of a hydroponic culture apparatus according to still another embodiment of the present invention.

As shown in FIG. 4, the respective culture tanks 6 are connected to respective liquid supply pump units 40, and the respective liquid supply pump units 40 are connected to a pressure control pipe 50 through air pipes 52 extending from it. The pressure control pipe 50 is connected to the air supply pump 8. The air supply pump 8 operates upon reception of a power from the solar battery 10 as the power supply. The pressure control pipe 50 has a comparatively large sectional area. When the internal pressure of the pressure control pipe 50 is increased by air supplied from the air supply pump 8, a uniform pressure is generated in the entire inner portion of the pressure control pipe 50.

In this manner, when the plurality of culture tanks 6 are connected to one air supply pump 8, air is supplied by connecting the respective liquid supply pump units 40 and the air supply pump 8 to each other through the pressure control pipe 50. Thus, the pneumatic pressures applied to the respective air pipes 52 become uniform. A difference is not formed in the amount of air supplied to the respective liquid supply pump units 40 due to variations in pneumatic pressure, or a difference is not formed in flow of the culture liquid in the respective culture tanks 6 due to a difference in air supply amount.

As described above, when the plurality of culture tanks 6 are connected to the air supply pump 8, the culture liquid must not basically communicate among the culture tanks 6 in order to prevent infection. For this purpose, the respective liquid supply pump units 40 or culture tanks 6 are formed with water level controllers (not shown). The water levels of the respective liquid supply pump units 40 are maintained at the uniform value without connecting the culture tanks 6 to each other through water pipes or the like.

Finally, results of experiments conducted by using the hydroponic culture apparatuses of these embodiments will be described.

An experimental result obtained by using the hydroponic culture apparatus 5 shown in FIG. 3 will be described. The employed solar battery 10 has an area of about 100 $cm^2$=10 cm×10 cm, an open voltage of about 1.2 V, and an output of 1.2 W. The discharge amount of the air supply pump 8 is 500 ml per minute, and the volume of the container 12 is about 100 l. When the hydroponic culture apparatus 5 is constituted with this specification, air is discharged from the discharge pipe 48 almost once every 3 minutes, and the water level changes by about several cm to several mm accordingly. When the volume of container 12 is 8 l to 150 l, same effect may be obtained.

An experimental result obtained by using the hydroponic culture apparatus 2 shown in FIG. 2 will be described. The employed solar battery 10 has an area of about 0.36 $m^2$60 cm×60 cm, an open voltage of about 100 V, and an output of 40 W. The discharge amount of the air supply pump 8 is 140 l per minute. Each of the connected culture tanks 6 has a length of 25 cm, a width of 90 cm, and a depth of 10 cm. The culture tanks 6 having these specifications were arranged to be parallel to each other in two layers. The obtained flow rate of the culture liquid in the culture tanks 6 was about 50 cm per minute.

As is apparent from these experimental results, the hydroponic culture apparatus according to the present invention can sufficiently flow the culture liquid even though its power consumption is small. If a solar battery is used, the apparatus becomes environment conscious. If the solar battery is used, plant hydroponic culture is enabled even in an area, e.g., a desert area, where power is not supplied by an electric power company.

What is claimed is:

1. A liquid supply pump unit comprising
   a container for containing a culture liquid for hydroponic plant culture,
   a partition member for partitioning an interior of said container to charge said partitioned interior with air,
   an air blow portion formed below said partition member to supply air inside said partition member,
   an air supply pump for supplying air to said air blow portion,
   an air discharge portion for intermittently discharging air from said partition member to a portion above said partition member, and
   an inflow/outflow pipe unit connected to a side surface of said container to allow the culture liquid to flow into/from said container upon a change in liquid level of the culture liquid caused by air discharge from said air discharge portion.

2. A hydroponic culture apparatus constituted by connecting a culture tank to said inflow/outflow pipe unit of said liquid supply pump unit according to claim 1.

3. An apparatus according to claim 2, wherein
   said liquid supply pump unit and said culture tank are connected to each other by the inflow/outflow pipe unit, said inflow/outflow pipe unit comprising a separate outflow pipe and a separate inflow pipe.
   said outflow pipe has a one-way valve for allowing only a flow of the culture liquid from said liquid supply pump unit to said culture tank, and an outflow port directed to said culture tank to open at a position in said culture tank far from a liquid supply pump unit side, and
   said inflow pipe has a one-way valve for allowing only a flow of the culture liquid from said culture tank to said liquid supply pump unit, and an inflow port on a culture tank side which is mounted on a side surface of said culture tank on said liquid supply pump unit side.

4. An apparatus according to claim 2, wherein said air discharge portion comprises a U-shaped pipe having one end open in an upper portion of an air reservoir partitioned by said partitioning member and the other end extending through said partitioning member to open above said partitioning member.

5. An apparatus according to claim 2, wherein said air discharge portion comprises a valve which is opened when a pressure reaches a predetermined value and continuously open until a pressure difference substantially disappears.

6. An apparatus according to claim 2, wherein said air discharge portion comprises a valve which is opened/closed in accordance with a lapse of time.

7. An apparatus according to claim 2, wherein a solar battery is used as a power supply to drive said air supply pump.

8. An apparatus according to claim 7, wherein a commercial power supply is used as an auxiliary power supply to drive said air supply pump.

9. A unit according to claim 1, wherein said air discharge portion comprises a U-shaped pipe having one end open in an upper portion of an air reservoir partitioned by said partition member and the other end extending through said partition member to open above said partition member.

10. A unit according to claim 1, wherein a solar battery is used as a power supply to drive said air supply pump.

11. A unit according to claim 10, wherein a commercial power supply is used as an auxiliary power supply to drive said air supply pump.

12. A unit according to claim 1, wherein said air discharge portion comprises a valve which is opened when a pressure reaches a predetermined value and continuously open until a pressure difference substantially disappears.

13. A unit according to claim 1, wherein said air discharge portion comprises a valve which is opened/closed in accordance with a lapse of time.

14. A hydroponic culture apparatus comprising
a container for containing a culture liquid for hydroponic plant culture,
a partition member for partitioning an interior of said container to charge said partitioned interior with air,
an air blow portion formed below said partition member to supply air inside said partition member,
an air supply pump for supplying air to said air blow portion,
an air discharge portion for intermittently discharging air from said partition member to a portion above said partition member, and
a solar battery serving as a power supply to drive said air supply pump.

15. An apparatus according to claim 14 wherein said air discharge portion comprises a U-shaped pipe having one end open in an upper portion of an air reservoir partitioned by said partitioning member and the other end extending through said partitioning member to open above said partitioning member.

16. An apparatus according to claim 14, wherein said air discharge portion comprises a valve which is opened when a pressure reaches a predetermined value and continuously open until a pressure difference substantially disappears.

17. An apparatus according to claim 14, wherein said air discharge portion comprises a valve which is opened/closed in accordance with a lapse of time.

\* \* \* \* \*